United States Patent
Takamatsu et al.

(10) Patent No.: US 6,586,496 B1
(45) Date of Patent: Jul. 1, 2003

(54) PHOTOCURABLE RESIN COMPOSITION FOR SEALING MATERIAL AND METHOD OF SEALING

(75) Inventors: Yasushi Takamatsu, Yokahama (JP); Kei Nagata, Fujisawa (JP); Masahiro Ota, Yokohama (JP); Yasushi Mizuta, Yokohama (JP); Yoshio Kikuta, Yokohama (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/787,951

(22) PCT Filed: Aug. 9, 2000

(86) PCT No.: PCT/JP00/05329

§ 371 (c)(1),
(2), (4) Date: Mar. 23, 2001

(87) PCT Pub. No.: WO01/12745

PCT Pub. Date: Feb. 22, 2001

(30) Foreign Application Priority Data

Aug. 12, 1999 (JP) .......................... 11-228411

(51) Int. Cl.$^7$ .............. C08F 2/46; C08F 2/48
(52) U.S. Cl. ............ 522/168; 522/100; 522/71; 522/77; 522/83; 524/107; 524/114; 156/272.2; 156/275.1; 156/275.3; 156/326; 156/325; 156/327; 156/330; 156/331.1; 428/1.1; 428/1.5; 428/345; 428/355 R; 428/355 EP; 427/508; 427/516; 427/207.1
(58) Field of Search .............. 522/168, 100, 522/71, 77, 83; 524/107, 114; 428/1.1, 1.5, 345, 355 R, 355 EP; 156/272.2, 275.1, 275.3, 326, 325, 327, 330, 331.1; 427/508, 516, 207.1

(56) References Cited

U.S. PATENT DOCUMENTS

| | | | | | |
|---|---|---|---|---|---|
| 4,394,403 | A | * | 7/1983 | Smith ..................... | 427/500 |
| 5,674,922 | A | * | 10/1997 | Igarashi et al. ........... | 522/168 |
| 5,882,842 | A | * | 3/1999 | Akaki et al. ............ | 430/280.1 |
| 5,981,616 | A | | 11/1999 | Yamamura et al. | |
| 6,166,101 | A | * | 12/2000 | Takami .................... | 427/508 |
| 6,190,833 | B1 | * | 2/2001 | Shiota et al. ............ | 430/192 |
| 6,313,188 | B1 | * | 11/2001 | Takahashi ................ | 522/168 |
| 6,322,892 | B1 | * | 11/2001 | Takami ................... | 427/386 |
| 2001/0018477 | A1 | * | 8/2001 | Kumakura et al. ......... | 524/107 |

FOREIGN PATENT DOCUMENTS

| | | |
|---|---|---|
| EP | 848294 | 6/1998 |
| JP | 5-43866 | 2/1993 |
| JP | 7-53711 | 2/1995 |
| JP | 10-330717 | 12/1998 |
| JP | 11-140279 | 5/1999 |
| JP | 11-209599 | 8/1999 |

* cited by examiner

*Primary Examiner*—James J. Seidleck
*Assistant Examiner*—Sanza L. McClendon
(74) *Attorney, Agent, or Firm*—Burns, Doane, Swecker & Mathis, LLP

(57) ABSTRACT

A photo-curable resin composition for sealing material, which is superior in the photo-curing performance and in the prompt curing property and is better in the adhesive property, in the resistance to moisture permeation and in the heat resistance, the photo-curable resin composition comprising (A) a compound having oxetane ring,
(B) a photoinitiator for cationic polymerization and
(C) a silane coupling agent, wherein the composition has a viscosity in the range from 0.01 to 300 Pa.s at 25° C.

19 Claims, No Drawings

PHOTOCURABLE RESIN COMPOSITION FOR SEALING MATERIAL AND METHOD OF SEALING

FIELD OF THE TECHNIQUE

The present invention relates to a photo-curable resin composition for use as a sealing material, which comprises a compound having oxetane ring, as well as to a method for sealing an article, such as flat panel.

BACKGROUND OF THE TECHNIQUE

In recent years, flat panel displays using various display elements have been developed and brought into industrial production in the electronic and electric industries. Many of these displays are made of cells of glass or plastic flat panels enclosing the display elements with sealing. Representatives of such displays are liquid crystal (LC) displays and electroluminescence (EL) displays.

In general, LC display cell has the structure in which a layer of liquid crystal is placed between two substrate glass boards and is sealed along the circumference with a sealing material. Heretofore, thermosetting epoxy resins have been used for the sealing material. There was, however, a problem that a high productivity cannot be expected using such a sealing material of thermosetting epoxy resin, since it is necessary to heat the resin at a temperature as high as 150–180° C. for about two hours in order to attain sufficient curing of the epoxy resin.

On the other hand, EL displays are superior in the high brightness, high efficiency and high responding speed and have attracted notice as flat panel display of next generation. As the display element, inorganic and organic EL display elements have been proposed and inorganic EL display elements are now in practical use for, for example, back illumination of a wrist watch and so on. Organic EL display elements are superior in the high brightness, high efficiency, high responding speed and polychroism, as compared with inorganic EL display elements, but have lower heat resistance with a heat stability temperature of some 60–80° C. In sealing an organic EL display cell, there was, thus, a problem that satisfactory heat curing of the sealing is not attainable with thermosetting epoxy resin.

For obviating these problems, it has been examined to use a photo-curable sealing material capable of being cured promptly at lower temperatures.

As photo-curable sealing material, there are, in a rough grouping, two types, namely, a photo-radical polymerization type (photo-radical type) and a photo-cationic polymerization type (photo-cationic type).

A photo-radical type sealing material, for which an acrylic resin has predominantly been used, has an advantage of capability of employing a wide variety of monomers and oligomers of acrylates, nevertheless it exhibits an insufficient resistance to moisture permeation and is further requested to lower its rate of volumetric contraction and to improve its adhesive strength.

A photo-cationic type sealing material, for which an epoxy resin has predominantly been used, has a relatively better adhesive strength, nevertheless it is requested to be further improved in its photo-sensibility, prompt curability and moisture permeation resistance.

The object of the present invention is to provide a photo-curable resin composition for sealing material for, in particular, display cells, which is curable at lower temperatures and which is superior in the photosensibility, in the prompt curing property, in the adhesive property, in the ability of forming a cured product exhibiting a high adhesive strength and in the resistance to moisture permeation, permits better productivity of the sealed product, such as display panels etc., and can be used favorably, above all, for flat panels of displays based on liquid crystal and on electroluminescence, and to provide a sealing material as well as to provide a sealing method using such a sealing material.

DISCLOSURE OF THE INVENTION

The inventors discovered from sound researches that the problems inherent in the conventional photo-curable resin composition for sealing material mentioned above can be obviated by using, for a photo-curable resin composition as the starting mixture of the sealing resin, a compound having oxetane ring, a photoinitiator for cationic polymerization and a silane coupling agent and that a photo-curable resin composition for sealing material, which is superior in the photosensibility, prompt curability, adhesive strength, resistance to moisture permeation and heat resistance, can be obtained by controlling the viscosity of the composition suitably, whereby the present invention has been completed.

Thus, the present invention resides in the following photo-curable resin composition, sealing material and method for sealing such a sealing material:

(1) A photo-curable resin composition for sealing material, comprising
 (A) a compound having oxetane ring,
 (B) a photoinitiator for cationic polymerization and
 (C) a silane coupling agent,
wherein the composition has a viscosity in the range from 0.01 to 300 Pa.s at 25° C.

(2) The photo-curable resin composition for sealing material as defined in the above (1), which comprises further
 (D) an inorganic filler of microparticles.

(3) The photo-curable resin composition for sealing material as defined in the above (1) or (2), which comprises further
 (E) a compound having epoxy group.

(4) The photo-curable resin composition for sealing material as defined in any one of the above (1) to (3), wherein it comprises
 (A) the compound having oxetane ring, in a proportion of 0.1–99.8% by weight,
 (B) the photoinitiator for cationic polymerization, in a proportion of 0.1–10% by weight
 (C) the silane coupling agent, in a proportion of 0.1–30% by weight,
 (D) the microparticulate inorganic filler, in a proportion of 0–70% by weight and
 (E) the compound having epoxy group, in a proportion of 0–99.7% by weight.

(5) The photo-curable resin composition for sealing material as defined in any one of the above (1) to (4), wherein the cured resin obtained by curing the photo-curable resin composition exhibits, under the condition of a temperature of 80° C. and a relative humidity of 95%, a moisture permeability of 250 g/(m²·24 hr) or less and an adhesive strength onto glass plate of 4.9 MPa (50 kgf/cm²) or more.
(6) A sealing material comprising the photo-curable resin composition as defined in any one of the above (1) to (5).
(7) A sealing material for flat panel display comprising the photo-curable resin composition as defined in any one of the above (1) to (5).
(8) A sealing material for liquid crystal display or electroluminescence display, comprising the photo-curable resin composition as defined in any one of the above (1) to (5).
(9) A method for sealing an article to be sealed, comprising applying the sealing material as defined in the above (6) to the article and subjecting the material to curing.
(10) A method for sealing a display cell of liquid crystal display or electroluminescence display, comprising applying the sealing material as defined in the above (8) to the cell and subjecting the material to curing.
(11) Sealed articles comprising cured layer of the sealing material as defined in the above (6), which seals the article.
(12) A display based on liquid crystal or electroluminescence, comprising a display cell sealed by the sealing material as defined in the above (8).

Below, the present invention will be described in more detail.

<<The Compound (A) Having Oxetane Ring>>

For the compound (A) having oxetane ring to be incorporated in the composition according to the present invention, every compound having at least one oxetane ring represented by the formula (1)

(1)

may be employed. There may be recited, for example, compounds having 1 to 15, preferably 1 to 10, especially preferably 1 to 4 oxetane rings.

<Compounds Having One Oxetane Ring>

Every compound having one oxetane ring may be used for this, wherein preference is given, for example, to those represented by the formula (2)

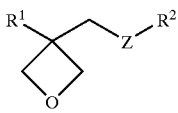
(2)

in which Z, R¹ and R² have the meanings as given below:
Z stands for oxygen atom or sulfur atom.
R¹ denotes hydrogen atom; fluorine atom; an alkyl group having 1–6 carbon atoms, such as methyl, ethyl, propyl, butyl, pentyl or hexyl; a fluoroalkyl group having 1–6 carbon atoms, such as trifluoromethyl, perfluoromethyl, perfluoroethyl or perfluoropropyl; an aryl group having 6–18 carbon atoms, such as phenyl or naphthyl; a furyl group; or a thienyl group.
R² denotes hydrogen atom; an alkyl group having 1–6 carbon atoms, such as methyl, ethyl, propyl, butyl, pentyl or hexyl; an alkenyl group having 2–6 carbon atoms, such as 1-propenyl, 2-propenyl, 2-methyl-1-propenyl, 2-methyl-2-propenyl, 1-butenyl, 2-butenyl or 3-butenyl; a substituted or non-substituted aralkyl group having 7–18 carbon atoms, such as benzyl, fluorobenzyl, methoxybenzyl, phenethyl, styryl, cinnamyl or ethoxybenzyl; an other aromatic ring-containing group, for example, an aryloxyalkyl, such as phenoxymethyl or phenoxyethyl; an alkylcarbonyl group having 2–6 carbon atoms, such as ethylcarbonyl, propylcarbonyl or butylcarbonyl; an alkoxycarbonyl group having 2–6 carbon atoms, such as ethoxycarbonyl, propoxycarbonyl or butoxycarbonyl; and N-alkylcarbamoyl group having 2–6 carbon atoms, such as ethylcarbamoyl, propylcarbamoyl, butylcarbamoyl and pentylcarbamoyl.

It is permissible that the compound having one oxetane ring has other substituent group(s) than those given above, in so far as the purpose of the invention is not obstructed thereby.

More concrete examples of the compound having one oxetane ring include 3-ethyl-3-hydroxymethyloxetane, 3-(meth)allyloxymethyl-3-ethyloxetane, (3-ethyl-3-oxetanylmethoxy)methylbenzene, 4-fluoro-{1-(3-ethyl-3-oxetanylmethoxy)methyl}benzene, 4-methoxy-{1-(3-ethyl-3-oxetanylmethoxy)methyl}benzene, {1-(3-ethyl-3-oxetanylmethoxy)ethyl}phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl)ether, 2-ethylhexyl(3-ethyl-3-oxetanylmethyl)ether, ethyl diethylene glycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl)ether, dicyclopentenylethyl(3-ethyl-3-oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, bornyl (3-ethyl-3-oxetanylmethyl)ether and so on.

<Compound Having Two Oxetane Rings>

As the compound having two oxetane rings, those represented by the formulae (3) and (4) are exemplified:

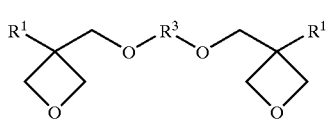
(3)

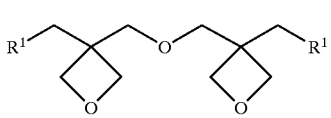
(4)

In the formulae (3) and (4), R¹ has the same meaning as that in the formula (2), wherein the two R¹ groups in the formulae (3) and (4) may be identical with or different from each other.

In the formula (3), R³ stands for a linear or branched alkylene group having 1–20 carbon atoms, such as ethylene, propylene or butylene; a linear or branched poly (alkyleneoxy) group having 1–120 carbon atoms, such as a poly(ethyleneoxy) group or a poly(propyleneoxy) group; a linear or branched unsaturated hydrocarbyl group, such as propenylene group, methylpropenylene group or butenylene group; carbonyl group; an alkylene group having carbonyl group; or an alkylene group having carbamoyl group inside the molecular chain, wherein $R^3$ may be a polyvalent radical selected from the group consisting of the radicals represented by the formulae (5) to (8) below.

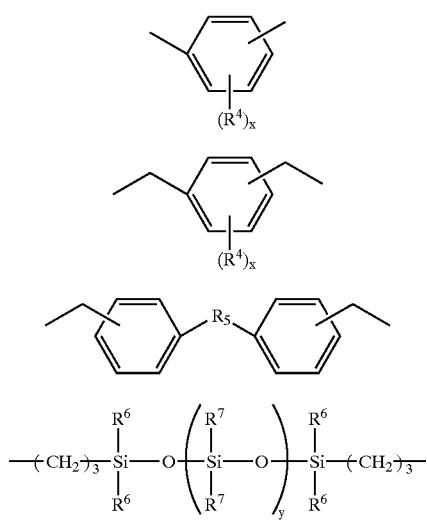

In the formulae (5) and (6), $R^4$ denotes hydrogen atom; an alkyl group having 1–4 carbon atoms, such as methyl, ethyl, propyl or butyl; an alkoxy group having 1–4 carbon atoms, such as methoxy, ethoxy, propoxy or butoxy; a halogen atom, such as chlorine or bromine; nitro; cyano; mercapto; a lower alkylcarboxyl group; carboxyl group; or carbamoyl group and X stands for an integer of 1–4.

In the formula (7), $R^5$ denotes oxygen atom, sulfur atom, methylene, —NH—, —SO—, —SO$_2$—, —C(CF$_3$)$_2$— or —C(CH$_3$)$_2$—.

In the formula (8), $R^6$ denotes an alkyl group having 1–4 carbon atoms, such as methyl, ethyl, propyl or butyl, or an aryl group having 6–18 carbon atoms, such as phenyl or naphthyl, y is an integer of 0 to 200 and $R^7$ denotes an alkyl group having 1–4 carbon atoms, such as methyl, ethyl, propyl or butyl, or an aryl group having 6–18 carbon atoms, such as phenyl or naphthyl, wherein $R^7$ may also be a radical represented by the formula (9).

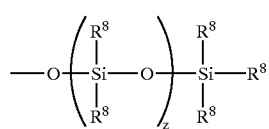

In the formula (9), $R^8$ denotes an alkyl group having 1–4 carbon atoms, such as methyl, ethyl, propyl or butyl, or an aryl group having 6–18 carbon atoms, such as phenyl or naphthyl, and z stands for an integer of 0 to 100.

More concretely, the compound having two oxetane rings may be exemplified by those represented by the formulae (10) and (11).

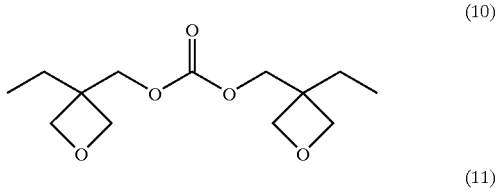

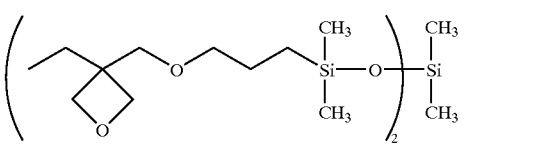

Concrete examples of individual compound having two oxetane rings include 3,7-bis(3-oxetanyl)-5-oxanonane, 1,4-bis{(3-ethyl-3-oxetanylmethoxy)methyl}benzene, 1,2-bis{(3-ethyl-3-oxetanylmethoxy)methyl}ethane, 1,2-bis{(3-ethyl-3-oxetanylmethoxy)methyl}propane, ethyleneglycol bis(3-ethyl-3-oxetanylmethyl)ether, dicyclopentenyl bis(3-ethyl-3-oxetanylmethyl)ether, triethyleneglycol bis(3-ethyl-3-oxetanylmethyl)ether, tetraethyleneglycol bis(3-ethyl-3-oxetanylmethyl)ether, tricyclodecanediyldimethylene bis(3-ethyl-3-oxetanylmethyl)ether, 1,4-bis{(3-ethyl-3-oxetanylmethoxy)methyl}butane, 1,6-bis{(3-ethyl-3-oxetanylmethoxy)methyl}hexane, polyethyleneglycol bis (3-ethyl-3-oxetanylmethyl)ether, EO-modifyed bisphenol A bis(3-ethyl-3-oxetanylmethyl)ether, PO-modified bisphenol A bis(3-ethyl-3-oxetanylmethyl)ether, EO-modified hydrogenated bisphenol A bis(3-ethyl-3-oxetanylmethyl)ether, PO-modified bisphenol A bis(3-ethyl-3-oxetanylmethyl) ether, EO-modified bisphenol F bis(3-ethyl-3-oxetanylmethyl)ether and so on.

<Compounds Having Three or More Oxetane Rings>

As the compounds having three or more oxetane rings, for example, those represented by the formula (12) are exemplified:

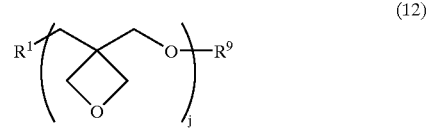

In the fromula (12), $R^1$ has the same meaning as that in the formula (2), wherein two or more $R^1$ in the formula (12) may be identical with or different from each other, $R^9$ denotes an organic residue having a valency of three to ten and may be, for example, a branched or linear alkylene radical having 1–30 carbon atoms, such as one of those represented by the formulae (13) to (15) given below, a branched poly(alkyleneoxy) radical, such as that represented by the formula (16) given below, or a linear or branched polysiloxane-containing radical, such as that represented by the formula (17) or (18) given below, and j represents an integer equal to the valency of $R^9$ and is 3 to 10.

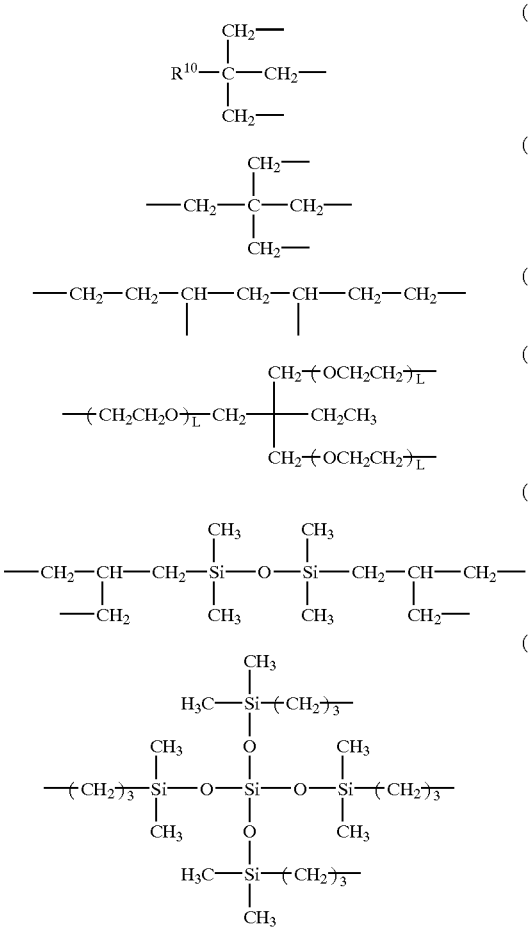

In the formula (13), $R^{10}$ denotes an alkyl group having 1–6 carbon atoms, such as methyl, ethyl, propyl, butyl, pentyl or hexyl.

In the formula (16), L denotes an integer of 1–10, wherein L may be identical with or different from each other.

As the compounds having three or more oxetane rings may concretely be exemplified those represented by the formulae (19) and (20) given below:

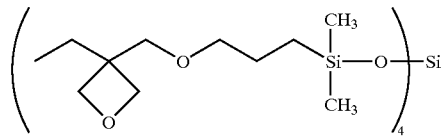

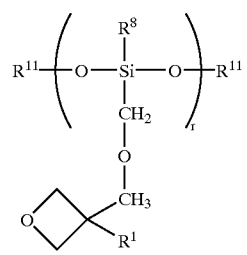

In the formula (20), $R^1$ has the same meaning as that in the formula (2), wherein two or more $R^1$ in the formula (20) may be identical with or different from each other, $R^8$ has the same meaning as that in the formula (9), wherein two or more $R^8$ in the formula (20) may be identical with or different from each other, $R^{11}$ s may be identical with or different from each other and denote an alkyl group having 1–4 carbon atoms, such as methyl, ethyl, propyl or butyl, or a trialkylsilyl group having 3–12 carbon atoms, wherein two or more alkyls in the trialkylsilyl group may be identical with or different from each other, such as for example, trimethylsilyl, triethylsilyl, tripropylsilyl or tributylsilyl, and r is an integer of 1–10.

Concrete examples of individual compounds having three or more oxetane rings include trimethylolpropane tris(3-ethyl-3-oxetanylmethyl)ether, pentaerythritol tris(3-ethyl-3-oxetanylmethyl)ether, pentaerythritol tetrakis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3oxetanylmethyl)ether, caprolactone-modified dipentaerythritol hexakis(3-ethyl-3-oxetanylmethyl)ether and ditrimethylolpropane tetrakis(3-ethyl-3-oxetanylmethyl)ether.

<High Molecular Weight Compounds>

As the compound (A) having oxetane ring, also high molecular weight compounds, other than those enumerated above, having number-average molecular weights as converted into those of polystyrene of about 1,000–5,000, determined by gel permeation chromatography, may be employed. For such high molecular weight compounds, those represented by the formulae (21) to (23) given below are exemplified.

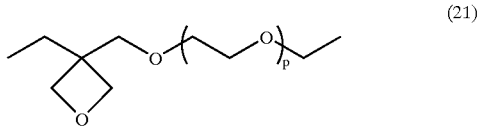

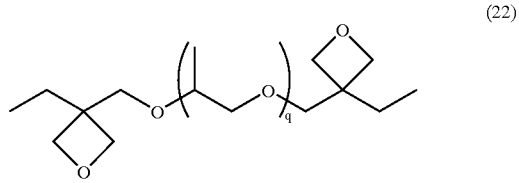

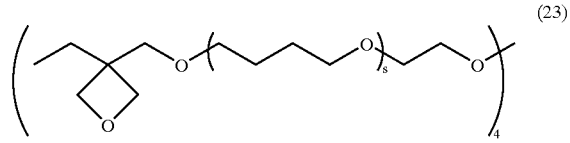

In the formula (21), p is an integer of 20–200. In the fromula (22), q is an integer of 15–200. In the formula (23), s is an integer of 20–200.

The compounds (A) having oxetane ring may be used solely or in combination of two or more of them.

When only the compound having one oxetane ring is used, the resulting polymerization product has a linear structure. On the other hand, the polymerization product obtained using the compound having one oxetane ring in combination with the compound having two or more oxetane rings has a three dimensional structure due to occurrence of cross linking and, thus, a higher mechanical strength. Therefore, it is convenient to use an adequate starting material so as to meet the practical purpose.

According to the present invention, a photo-curable resin composition superior in the photo-sensibility and in the prompt curability is obtained by the content of the oxetane ring-containing compound (A).

<<The photoinitiator (B) for Cationic Polymerization>>

The photoinitiator (B) for cationic polymerization consists of a compound functioning to initiate the cationic polymerization of the compound (A) having oxetane ring by the action of light and there is no special limitation for the photoinitiator (B) so long as it delivers such a function.

As favorable examples of the photoinitiator (B) for cationic polymerization, onium salts represented by the formula (24) given below may be mentioned. Such an onium salt is a compound liberating a Lewis acid on absorption of photon.

$$(R^{12}{}_a R^{13}{}_b R^{14}{}_c R^{15}{}_d W)_m{}^+ (MX_{n+m})_m{}^- \quad (24)$$

in which the cation is an onium ion and in which W denotes S, Se, Te, P, As, Sb, Bi, O, I, Br, Cl or N≡N, $R^{12}$, $R^{13}$, $R^{14}$ and $R^{15}$ denote each an identical or different organic residue, a, b, c and d represent each an integer of 0–3, wherein a+b+c+d equals to the valency of W, M represents a metal or metalloid atom constituting the central atom of the halogenide complex ($MX_{n+m}$), for example, B, P, As, Sb, Fe, Sn, Bi, Al, Ca, In, Ti, Zn. Sc, V, Cr, Mn or Co, X denotes a halogen atom, such as F, Cl or Br, m is the net value of electric charge of the halogenide complex and n is the valency of M.

Concrete examples of onium ion in the formula (24) include diphenyliodonium, 4-methoxydiphenyliodonium, bis(4-methylphenyl)iodonium, bis(4-tert-butylphenyl) iodonium, bis(dodecylphenyl)iodonium, triphenylsufonium, diphenyl-4-thiophenoxyphenylsufonium, bis{4-(diphenylsulfonio)-phenyl}sulfide, bis[4-{di(4-(2-hydroxyethyl)phenyl)sulfonio}-phenyl]sulfide, η⁶-2,4-(cyclopentadienyl){1,2,3,4,5,6-η-(methylethyl) benzene}iron(1+) and so on.

Concrete examples of the anion in the formula (24) include tetrafluoroborate, hexafluorophosphate, hexafluoroantimonate, hexafluoroarsenate, hexachloroantimonate and so on.

These photoinitiators can be used alone or in a combination of two or more of them.

The component (B) is essential for the photo-curable resin composition.

<<The Silane Coupling Agent (C)>>

The silane coupling agent to be used according to the present invention is a modifying agent known per se for improving the adhesive strength onto polymeric substrates or onto glass substrates, but can also improve the adhesive strength of such a resin onto various inorganic and organic substrates. For the silane coupling agent (C), silane compounds having a reactive group, such as epoxy, carboxy, methacryloyl or isocyanato, are employed.

Concrete examples of the silane coupling agent include trimethoxysilyl benzoate, γ-methacryloxypropyltrimethoxysilane, vinyltriacetoxysilane, vinyltrimethoxysilane, γ-isocyanatopropyltriethoxysilane, γ-glycidoxypropyltrimethoxysilane and β-(3,4-epoxycyclohexyl)ethyltrimethoxysilane.

These compounds of the component (C) may be used either alone or in a combination of two or more of them. The component (C) improves adhesive strength.

<<The microparticulate Inorganic Filler (D)>>

The photo-curable resin composition according to the present invention may favorably contain the microparticulate inorganic filler (D). The microparticulate inorganic filler has an average particle size of the primary particles in the range from 0.005 to 10 μm.

Concretely, the microparticulate inorganic filler consists of silica, talc, alumina, mica or calcium carbonate. For the microparticulate inorganic filler, those which have or have not been subjected to a surface treatment may be used. As the microparticulate filler which has been subjected to a surface treatment, for example, those methoxylated, trimethylsilylated and octylsilylated ones and those having been subjected to a surface treatment with silicone oil may be employed.

These fillers (D) may be employed either alone or in a combination of two or more of them.

The microparticulate inorganic filler (D) is effective for providing the cured resin with a resistance to moisture permeation, an adhesive strength and a thixotropy.

<<The Compound Having Epoxy Group (E)>>

The photo-curable resin composition according to the present invention may favorably contain the compound having epoxy group (E). As the compound having epoxy group (E), those which are given below may be exemplified.

As the compound having one epoxy group, there may be mentioned, for example, phenyl glycidyl ether and butyl glycidyl ether. As the compound having two or more epoxy groups, there may be mentioned, for example, hexanediol diglycidyl ether, tetraethyleneglycol diglycidyl ether, neopentylglycol diglycidyl ether, trimethylolpropane triglycidyl ether, bisphenol A diglycidyl ether, bisphenol F diglycidyl ether and novolak-type epoxy compounds.

There may be exemplified also alicyclic compounds having epoxy group in the ring, such as those represented by the formulae (25) and (26).

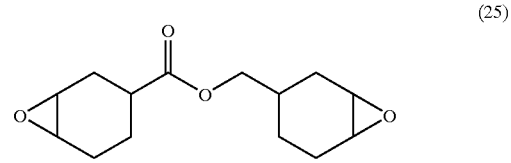

(25)

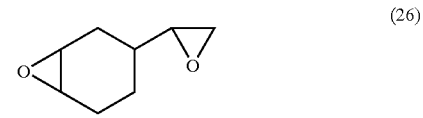

(26)

These compounds for the component (E) may be employed either alone or in a combination of two or more of them. Incorporation of the component (E) is effective for improving the adhesive property and the heat resistance of the sealing material according to the present invention.

The photo-curable resin composition for sealing material according to the present invention contains the above components (A) to (C) as the inevitable constituents and the above components (D) and (E) as optional constituents. The compounding proportion of these components may usually be such that the composition comprises the component (A) in a proportion of 0.1 to 99.8% by weight, preferably 1 to 93.4% by weight, more preferably 3 to 86% by weight, the component (B) in a proportion of 0.1 to 10% by weight, preferably 0.3 to 8% by weight, more preferably 0.5 to 6% by weight, the component (C) in a proportion of 0.1 to 30% by weight, preferably 0.3 to 20% by weight, more preferably 0.5 to 10% by weight, the component (D) in a proportion of 0 to 70% by weight, preferably 5 to 60% by weight, more preferably 10 to 50% by weight, and the component (E) in a proportion of 0 to 99.7% by weight, preferably 1 to 93.4% by weight, more preferably 3 to 86% by weight.

<<Other Components>>

The resin composition according to the present invention may contain, within the range not obstructing the purpose of the invention, other compound(s) subject to cationic polymerization, other resinous component, other filler, modifying agent(s), stabilizer and the like.

<Other Compound(s) Subject to Cationic Polymerization>

For other compound(s) subject to cationic polymerization, there may be employed, for example, oxolane compounds, cyclic acetals, cyclic lactones, thiirane compounds, thiethane compounds, spiro-orthoesters, vinyl ethers, ethylenically unsaturated compounds, cyclic ethers, cyclic thioethers and vinyl compounds. They may be employed either alone or in a combination of two or more of them.

<Other Resinous Component>

For other resinous component, there may be mentioned, for example, polyamides, polyamidoimides, polyurethanes, polybutadiene, polychloroprene, polyethers, polyesters, styrene/butadiene/styrene block copolymer, petroleum resin, xylol resin, ketone resin, cellulose resin, fluorine-containing oligomers, oligomers based on silicone, oligomers based on polysulfide, acrylic rubber and silicon rubber. They can be employed either alone or in a combination of two or more of them.

<Other Filler>

For such other filler, there may be mentioned, for example, glass beads, particulate polymers based on styrene, particulate polymers based on divinylbenzene, particulate polymers based on methacrylate, particulate polymers based on ethylene and particulate polymers based on propylene. They may be employed either alone or in a combination of two or more of them.

<Modifying Agent>

For the modifying agent, there may be mentioned, for example, assistant polymerization initiator, antioxidant, levelling agent, wettability improving agent, surfactant, plasticizer and UV absorber. They may be employed either alone or in a combination of two or more of them.

Preparation of the Resin Composition

The photo-curable resin composition for sealing material according to the present invention is prepared by mixing the constituent components uniformly in such a manner that the blend has a viscosity in the range from 0.01 to 300 Pa.s at 25° C. The resin composition having a viscosity in the range of 0.01–300 Pa.s at 25° C. is favorable for its easy and efficient workability on application onto the substrate such as flat panel of display and for its better blend stability. It is more preferable that the resin composition has a viscosity in the range of 0.1–100 Pa.s at 25° C.

The viscosity of the resin composition can be adjusted by an adequate choice of the constituting components and mixing proportion thereof and by addition of other component(s), if necessary. The components (A) and (E) of lower molecular weights are in a liquid state at normal temperature and, therefore, the viscosity of the composition can easily be adjusted within the above-mentioned range by dissolving or dispersing other solid components in these liquid components. If the viscosity is higher, the blending work can be realized efficiently by a conventional practice, for example, using a three roll kneader.

<<The Sealing Material>>

The sealing material according to the present invention comprises the photo-curable resin composition described above. Such sealing material may be either constituted of only the above-mentioned components of the resin composition or constituted of these components with addition of other constituent ingredients. Such other constituent ingredients may include, for example, particulate material to be served as a spacer.

<<Method for Sealing>>

The method for sealing an article to be sealed according to the present invention comprises sealing the article with the sealing material described above and subjecting the material to curing by irradiation of light. As the article to be sealed by the method with the sealing material according to the present invention, display cells on flat panel of LC display and of EL display may be mentioned as representative ones, though semiconductor devices, such as those in which semiconductor elements, such as CCD etc., are encased in a casing with closure member, and those in which gas tight sealing is maintained for evading permeation of moisture, may also be sealed by the method according to the present invention.

As for the practical way of applying the sealing material according to the present invention on an article to be sealed, such as display substrate board or so on, no special restriction is placed thereon so long as a uniform application is permitted. It is enough to apply the sealing material onto the article to be sealed by way of a known practice, such as screen printing or use of a dispenser. In sealing a display cell, the sealing material according to the present invention is interposed between two substrate boards so as to enclose the display element to build up the display cell therebetween, whereon the resulting assembly is subjected to irradiation of a light to cause curing of the sealing material at a lower temperature. For the light source, any one permitting to cause curing of the sealing material within a contemplated working time may be used. Usually, a light source capable of radiating a light of a wave length within the range of ultraviolet to visible light is employed. In the practice, a low pressure mercury lamp, a high pressure mercury lamp, xenon lamp or a metal halide lamp is used. The dosage of the light irradiation may usually be selected adequately within the range in which no residue of uncured resin composition remains or no deterioration in the adhesion occurs in case the irradiation dose is low, while ordinary dosage is in the range of 500–3,000 mJ/cm$^2$. While there is no special upper limit is placed on the irradiation dosage, a superfluous dosage may not be favorable in view of the lowering of the productivity and uneconomical energy consumption.

By subjecting the assembly, obtained after application of the above-mentioned sealing material onto the article to be sealed, to irradiation of light, the photo-curable resin composition is cured to build up a sealed article. In this manner, for example, a display panel is obtained in case the sealed article is a diaplay cell or a semiconductor device, such as CCD, sealed in a similar way is obtained in case the sealed article is a semicontuctor element.

Material Properties of the Cured Resin

The material properties of the cured resin of the photo-curable composition according to the present invention are determined by the methods given below.

Moisture Permeation Rate

A film sample (with a thickness of 100 $\mu$m) of the photo-cured resin composition is tested for its moisture permeation rate according to JIS Z 0208.

Adhesive Strength

A layer (with a thickness of 100 $\mu$m) of the resin composition according to the present invention is placed between two glass plates and the resulting assembly is subjected to irradiation of a light, in order to cause the resin composition to be cured into an adhered sample. The adhesive strength is determined by observing the force to peel off the glass plate from each other at a rate of drawing of the glass plates of 2 mm/min.

The cured mass obtained by curing the photo-curable resin composition according to the present invention has a moisture permeation rate under the condition of 80° C. and 95% relative humidity of 250 g/(m$^2$.24 hr) or less and an adhesive strength of 4.9 MPa (50 kgf/cm$^2$) or more. A photo-curable resin composition having the properties as given above shows a better balance between the resistance to moisture permeation and the adhesive property and, thus, is adapted for a sealing material. While it is difficult in general to satisfy both these conditions simultaneously, this can be attained by the photo-curable resin composition for sealing material according to the present invention.

As described above, it is made possible by using an oxetane ring-containing compound, a photoinitiator for cationic polymerization and a silane coupling agent and by controlling the viscosity in accordance with the present invention, to obtain a photo-curable resin composition for sealing material for, in particular, display cell, which is curable at lower temperatures and which is superior in the photosensibility, in the prompt curing property, in the adhesive property, in the ability of forming a cured product exhibiting a high adhesive strength and in the resistance to moisture permeation, permits better productivity of the sealed product, such as display etc., and can be used favorably for flat panels of displays based on LC and EL.

THE BEST MODE FOR EMBODYING THE INVENTION

Below, the present invention will be described in detail by way of Examples, though the present invention should not be restricted by these Examples.

Testing Methods

For the photo-curable resin compositions and the cures products obtained, the following assessments were carried out.

Viscosity

The viscosities of the resin compositions before curing were determined using a rotary cone/disc viscometer at 25° C.

Curing Performance

The curing performance of the resin composition is assessed by coating a glass plate with a layer of the resin composition in a thickness of 100 $\mu$m and the coated layer is subjected to irradiation of light, whereupon the state of curing of the coated layer is assessed by finger touch with the assessment rating criterion given below.

○: sufficiently cured
Δ: partial uncured residue
×: not cured

Adhesive Strength

Adhesive strength was determined by the method given previously.

Rate of Permeation of Moisture

Moisture permeation rate was determined by the method given previously.

Starting Materials

The Compound (A) Having Oxetane Ring

Oxetane a-1: 1,4-bis{(3-ethyl-3-oxetanylmethoxy)methyl}benzene
Oxetane a-2: 3-ethyl-3-hydroxymethyloxetane Photoinitiator (B) for Cationic Polymerization Photoinitiator b-1:
  the compound represented by the formula (27)
Photoinitiator b-2:
  the compound represented by the formula (28)

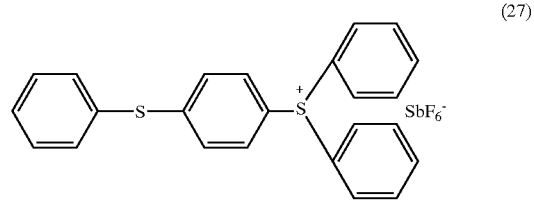

(27)

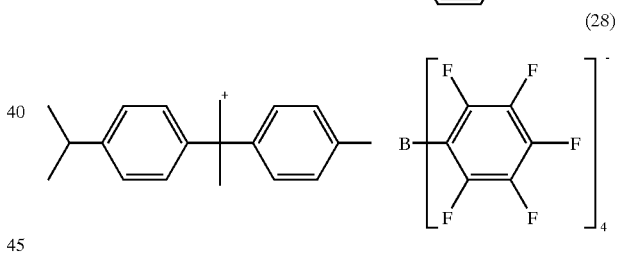

(28)

The Silane Coupling Agent (C)

Silane coupling agent c-1:
  γ-glycidoxypropyltrimethoxysilane

Microparticulate Inorganic Filler (D)

Microparticulate silica d-1:
  a microparticulate talc having an average particle size of the primary particles of 1 $\mu$m without being subjected to surface treatment
Microparticulate silica d-2:
  a microparticulate silica having an average particle size of the primary particles of 12 nm without being subjected to surface treatment Compound Having Epoxy Group (E)

Epoxy compound e-1:
  Bisphenol F diglycidyl ether
Epoxy compound e-2:
  the compound represented by the formula (29)
Epoxy compound e-3:
  the compound represented by the formula (30)

Epoxy compound e-4:
the compound represented by the formula (25)

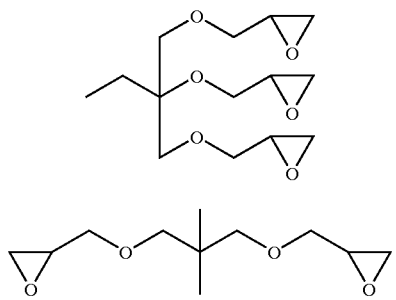

EXAMPLE 1

Preparation of the Photo-curable Resin Composition

By compounding, in accordance with the blending recipi given in Table 1, 94 parts by weight of the oxetane a-1, namely, 1,4-bis{(3-ethyl-3-oxetanylmethoxy)methyl}benzene, as the compound (A), 3 parts by weight of the photoinitiator b-1 of the formula (27), as the photoinitiator (B) for cationic polymerization, and 3 parts by weight of the silane coupling agent c-1, namely, γ-glycidoxypropyltrimethoxysilane, as the silane coupling agent (C), and agitating the mixture for 1 hour, a transparent liquid composition was obtained.

Photo-curing

A layer (with a thickness of 100 μm) of the resin composition obtained as above was interposed in between two glass plates (JIS R-3202) and the resulting assembly was subjected to irradiation of a light from a metal halide lamp at 3,000 mJ/cm² to cause the resin composition to be cured. The curing performance and the material properties of the cured product were assessed, the results of which are recited in Table 2.

EXAMPLES 2–8

In the same manner as in EXAMPLE 1 except that the components given in Table 1 were employed, resin compositions were prepared and the assessments as in EXAMPLE 1 were carried out, the results of which are recited in Table 2.

COMPARATIVE EXAMPLES 1–8

In the same manner as in EXAMPLE 1 except that the components given in Table 3 were employed, resin compositions were prepared and the assessments as in EXAMPLE 1 were carried out, the results of which are recited in Table 4.

TABLE 1

| Component (wt. %) | Example 1 | 2 | 3 | 4 | 5 | 6 | 7 | 8 |
|---|---|---|---|---|---|---|---|---|
| Component (A) | | | | | | | | |
| Oxetane a-1 | 35 | 35 | 45 | 63 | 70 | 63 | 70 | 94 |
| Oxetane a-2 | — | — | — | 10 | — | 21 | 24 | — |
| Component (B) | | | | | | | | |
| Phoroinitiator b-1 | 3 | — | 3 | 3 | 3 | 3 | 3 | 3 |
| Phoroinitiator b-2 | — | 3 | — | — | — | — | — | — |
| Component (C) | | | | | | | | |
| Silane coupl. agent c-1 | 3 | 3 | 3 | 3 | 3 | 3 | 3 | 3 |
| Component (D) | | | | | | | | |
| Micropartic. talc d-1 | 30 | 30 | — | — | — | — | — | — |
| Micropartic. silica d-2 | — | — | 10 | 10 | — | 10 | — | — |
| Component (E) | | | | | | | | |
| Epoxy compound e-1 | 29 | 29 | 39 | — | — | — | — | — |
| Epoxy compound e-2 | — | — | — | 11 | 24 | — | — | — |

TABLE 2

| Material properties | Example 1 | 2 | 3 | 4 | 5 | 6 | 7 | 8 |
|---|---|---|---|---|---|---|---|---|
| Viscosity (mPa · s) | 60.000 | 60.000 | 50.000 | 2.500 | 150 | 2.000 | 107 | 134 |
| Curing performance | ○ | ○ | ○ | ○ | ○ | ○ | ○ | ○ |
| Adhesive strength (MPa) | 24.0 | 20.6 | 22.5 | 24.0 | 22.6 | 14.5 | 11.8 | 8.7 |
| Moisture permeation rate (g/(m² · 24 hr)) | | | | | | | | |
| at 40° C. 90% RH | 5 | 5 | 5 | 18 | 24 | 19 | 23 | 20 |
| at 80° C. 95% RH | 99 | 90 | 101 | 150 | 200 | 170 | 190 | 180 |

TABLE 3

| Component (wt. %) | Comparative Example 1 | 2 | 3 | 4 | 5 | 6 | 7 | 8 |
|---|---|---|---|---|---|---|---|---|
| Component (A) | | | | | | | | |
| Oxetane a-1 | 97 | — | — | — | — | — | — | — |
| Component (B) | | | | | | | | |
| Phoroinitiator b-1 | 3 | 3 | 3 | 3 | 3 | 3 | 3 | 3 |
| Phoroinitiator b-2 | — | — | — | — | — | — | — | — |
| Component (C) | | | | | | | | |
| Silane coupl. agent c-1 | — | 3 | 3 | 3 | 3 | 3 | 3 | 3 |

TABLE 3-continued

| | Comparative Example | | | | | | | |
|---|---|---|---|---|---|---|---|---|
| Component (wt. %) | 1 | 2 | 3 | 4 | 5 | 6 | 7 | 8 |
| Component (D) | | | | | | | | |
| Micropartic. talc d-1 | — | — | — | — | — | 30 | 30 | 30 |
| Component (E) | | | | | | | | |
| Epoxy compound e-1 | — | 94 | — | — | — | 64 | — | — |
| Epoxy compound e-2 | — | — | 94 | — | 30 | — | 64 | — |
| Epoxy compound e-3 | — | — | — | 94 | — | — | — | — |
| Epoxy compound e-4 | — | — | — | — | 64 | — | — | 64 |

TABLE 4

| | Example | | | | | | | |
|---|---|---|---|---|---|---|---|---|
| Material properties | 1 | 2 | 3 | 4 | 5 | 6 | 7 | 8 |
| Viscosity (mPa · s) | 137 | 3.000 | 150 | 12 | 330 | 60.000 | 60.000 | 50.000 |
| Curing performance | ○ | ○ | ○ | x | ○ | ○ | ○ | ○ |
| Adhesive strength (MPa) | 4.5 | 4.9 | 18.2 | — | 5.7 | 3.3 | 3.5 | 4.4 |
| Moisture permeation rate (g/(m² · 24 hr)) | | | | | | | | |
| at 40° C. 90% RH | 19 | 26 | 56 | — | 25 | 23 | 46 | 23 |
| at 80° C. 95% RH | 170 | 300 | 800 | — | 380 | 270 | 650 | 330 |

INDUSTRIAL APPLICABILITY

The sealing material comprising the photo-curable resin composition for sealing material according to the present invention can be used favorably for sealing an article to be sealed, such as flat panels of display cells for displays based on liquid crystal or on electroluminescence and semiconductor devises of, for example, CCD and so on.

What is claimed is:

1. A photo-curable resin composition for sealing material comprising:
   (A) a compound having at least one oxetane ring, in a proportion of 3 to 86% by weight,
   (B) a photoinitiator for cationic polymerization, in a proportion of 0.1–10% by weight,
   (C) a silane coupling agent, in a proportion of 0.1–30% by weight,
   (D) a microparticulate inorganic filler, in a proportion of 0–70% by weight and
   (E) a compound having epoxy group, in a proportion of 0–99.7% by weight
   wherein the composition has a viscosity in the range from 0.01 to 300 Pa.s at 25° C.

2. The photo-curable resin composition for sealing material as claimed in claim 1, wherein the cured resin obtained by curing the photo-curable resin composition exhibits, under the condition of a temperature of 80° C. and a relative humidity of 95%, a moisture permeability of 250 g/(m²·24 hr) or less and an adhesive strength onto glass plate of 4.9 MPa (50 kgf/cm²) or more.

3. A sealing material comprising the photo-curable resin composition as claimed in claim 2.

4. A method for sealing an article to be sealed, comprising applying the sealing material as claimed in claim 3 to the article and subjecting the material to curing.

5. Sealed articles comprising cured layer of the sealing material as claimed in claim 3, which seals the article.

6. A sealing material for flat panel display, comprising the photo-curable resin composition as claimed in claim 2.

7. A sealing material for liquid crystal display or electroluminescence display, comprising the photocurable resin composition as claimed in claim 2.

8. A sealing material comprising the photo-curable resin composition as claimed in claim 1.

9. A method for sealing an article to be sealed, comprising applying the sealing material as claimed in claim 8 to the article and subjecting the material to curing.

10. Sealed articles comprising cured layer of the sealing material as claimed in claim 8, which seals the article.

11. A sealing material for flat panel display, comprising the photo-curable resin composition as claimed in claim 1.

12. A sealing material for liquid crystal display or electroluminescence display, comprising the photocurable resin composition as claimed in claim 1.

13. A method for sealing a display cell of liquid crystal display or electroluminescence display, comprising applying a sealing material to the cell and subjecting the material to curing, wherein said sealing material comprises
   (A) a compound having at least one oxetane ring, in a proportion of 3–86% by weight,
   (B) a photoinitiator for cationic polymerization, in a proportion of 0.1–10% by weight,
   (C) a silane coupling agent, in a proportion of 0.1–30% by weight,
   (D) a microparticulate inorganic filler, in a proportion of 0–70% by weight, and
   (E) a compound having epoxy group, in a proportion of 0–99.7% by weight,
   wherein the composition has a viscosity in the range from 0.01 to 300 Pa.s at 25° C.

14. A display based on liquid crystal or electroluminescence, comprising a display cell sealed by a sealing material, wherein said sealing material comprises
   (A) a compound having at least one oxetane ring, in a proportion of 3–86% by weight,
   (B) a photoinitiator for cationic polymerization, in a proportion of 0.1–10% by weight,
   (C) a silane coupling agent, in a proportion of 0.1–30% by weight,
   (D) a microparticulate inorganic filler, in a proportion of 0–70% by weight, and
   (E) a compound having epoxy group, in a proportion of 0–99.7% by weight,
   wherein the composition has a viscosity in the range from 0.01 to 300 Pa.s at 25° C.

15. A method for sealing a display cell of liquid crystal display or electroluminescence display, comprising applying a sealing material to the cell and subjecting the material to curing, wherein said sealing material comprises (A) a compound having at least one oxetane ring, in a proportion of 3–86% by weight, (B) a photoinitiator for cationic polymerization, and (C) a silane coupling agent, wherein the composition has a viscosity in the range from 0.01 to 300 Pa.s at 25° C.

16. A display based on liquid crystal or electroluminescence, comprising a display cell sealed by a sealing material, wherein said sealing material comprises (A) a compound having at least one oxetane ring, in a proportion of 3–86% by weight, (B) a photoinitiator for cationic polymerization, and (C) a silane coupling agent, wherein the composition has a viscosity in the range from 0.01 to 300 Pa.s at 25° c.

17. The display of claim 16, wherein the sealing material further comprises (E) a compound having epoxy group.

18. The display of claim 16, wherein the sealing material further comprises (A) a compound having at least one oxetane ring, in a proportion of 3–86% by weight, (B) a photoinitiator for cationic polymerization, in a proportion of 0.1–10% by weight, (C) a silane coupling agent, in a proportion of 0.1–30% by weight, (D) a microparticulate inorganic filler, in a proportion of 0–70% by weight, and (E) a compound having epoxy group, in a proportion of 0–99.7% by weight.

19. The display of claim 16, wherein the cured sealing material exhibits, under the condition of a temperature of 80° C. and a relative humidity of 95%, a moisture permeability of 250 g/(m$^2$·24 hr) or less and an adhesive strength onto glass plate of 4.9 MPa (50 kgf/cm$^2$) or more.

* * * * *